United States Patent [19]

Warburton, Jr.

[11] Patent Number: 5,219,914

[45] Date of Patent: Jun. 15, 1993

[54] COSPRAY WASHOUT RESISTANT ROOF MASTIC

[75] Inventor: Charles E. Warburton, Jr., Ambler, Pa.

[73] Assignee: Rohm and Haas Company, Philadelphia, Pa.

[21] Appl. No.: 457,668

[22] Filed: Dec. 27, 1989

[51] Int. Cl.$^5$ .................. C08J 3/05; C08L 63/00; B05D 3/10; B05D 1/34

[52] U.S. Cl. .................. 524/501; 523/416; 523/417; 523/420; 524/514; 524/922; 427/333; 427/426

[58] Field of Search .............. 524/501, 514, 922; 523/416, 417, 420; 427/333, 426

[56] References Cited

U.S. PATENT DOCUMENTS

| | | |
|---|---|---|
| 2,807,597 | 9/1957 | Sonnenfeld ............ 524/501 |
| 3,475,358 | 10/1969 | Bixler ............ 524/501 |
| 3,660,338 | 5/1972 | Economou ............ 524/501 |
| 4,161,968 | 7/1979 | Rasmussen et al. ............ 428/479.3 |
| 4,207,353 | 6/1980 | Rasmussen et al. ............ 428/479.3 |
| 4,370,464 | 1/1983 | Tanaka et al. ............ 523/420 |
| 4,386,992 | 6/1983 | Takegawa et al. ............ 524/543 |
| 4,420,583 | 12/1983 | Hutton ............ 524/501 |
| 4,489,180 | 12/1984 | Lundberg ............ 524/501 |
| 4,571,415 | 2/1986 | Jordan, Jr. ............ 524/428 |
| 4,983,426 | 1/1991 | Jordan, Jr. ............ 524/432 |

Primary Examiner—Paul R. Michl
Assistant Examiner—Peter Szekely
Attorney, Agent, or Firm—Brian W. Stegman

[57] ABSTRACT

A washout resistant roof mastic is disclosed in which an emulsion is applied and contacted with a second material that causes the emulsion to flocculate and set quickly. The emulsion can be applied for example through an applicator that simultaneously applies the emulsion and the flocculant.

8 Claims, No Drawings 5,219,914

COSPRAY WASHOUT RESISTANT ROOF MASTIC

BACKGROUND OF INVENTION

This invention relates to water-based coating compositions for exterior surfaces which upon application quickly develop resistance to being washed out by precipitation. These compositions comprise an aqueous dispersion of water-insoluble latex polymer and a flocculating solution. When compared to solvent-based coatings, water-based coatings have the advantage of lower emissions of toxic solvents and easy cleanup of site and equipment. However, water-based coatings are vulnerable to water damage during and immediately after application.

Immediately after application, roof mastics are particularly vulnerable to being washed out by unanticipated precipitation. A substantial need exists for water-based roof mastics and other exterior water-based coatings products which resist washout immediately after application or shortly thereafter. This property is referred to as early washout resistance.

In U.S. Pat. No. 4,571,415, a water-soluble salt of a multivalent complex ion having labile, volatile ligands such as zinc ammonium complex ion is added to the roof mastic composition. It is believed that early washout resistance results from multivalent metal ion precipitation of the anionic polymers used to disperse pigments and that the multivalent metal ions become available for such precipitation as the complex metal ion is shifted through the various equilibria linking it to metal ion. The ligand, for example, is believed to be lost at the surface of the applied coating or caulk to the atmosphere.

There are some problems with incorporating the flocculant into the roof mastic composition before it is applied to the roof, as in U.S. Pat. No. 4,571,415. Zinc tetramine bicarbonate requires high formulation pH (e.g., 10) in order to maintain shelf stability. There also have been objections to ammonia odor. Use of a strongly cationic flocculant is precluded because colloidal stability must be maintained until the mastic is applied. This necessitates a latent flocculant, whose action must of necessity be delayed to some degree.

In U.S. Pat. No. 4,386,992, a cosprayed gelling agent is used to increase initial bond strength of an adhesive, such as when a polyurethane foam is bonded onto a steel board of an automobile ceiling.

In U.S. Pat. No. 3,823,024, a temporary protective coating that is easily stripped is disclosed. This coating is produced by spraying a stream of latex and a stream of coagulant onto the surface along with a debonding agent.

SUMMARY OF THE INVENTION

A washout resistant coating is disclosed which comprises an anionically stabilized dispersion of water insoluble latex and a quaternary cationic polymer. The two components are stored separately and sprayed on the application surface to form the final coating. The quaternary cationic polymer is preferably cosprayed with the anionic roof mastic. The preferred quaternary cationic polymer is polyamide-epichlorohydrin resin.

When the two streams mix the quaternary cationic polymer flocculates the anionic roof mastic to cause a quick set which prevents washout. The flocculating agent is not mixed with the roof mastic before use, which avoids shelf stability problems. Unlike the roof mastics that contain zinc complex, it is not necessary to await ammonia loss (pH drop) from the coating for flocculation to begin. Surprisingly, water resistance of the dried coatings is much better with the polyamide-epichlorohydrin resin than with the zinc complex.

DETAILED DESCRIPTION OF THE INVENTION

Anionic Polymer

The aqueous dispersions of water-insoluble latex polymer used in the compositions of the present invention are prepared by emulsion polymerization. Emulsion polymerization techniques are well known to the art, and are discussed in detail in D. C. Blackley, Emulsion Polymerization (Wiley, 1975). Any monomer mixture which yields water-insoluble polymer latex which is dispersible in water may be used to prepare the latex polymers of the present compositions. For example, vinyl acetate, which itself has appreciable water-solubility as a monomer, may be employed, as homopolymers of vinyl acetate are water-insoluble. Acrylic monomers such as the alkyl esters of acrylic acid and methacrylic acid are preferred. Examples of acrylic monomers which may be used to prepare the latex polymers of the present invention include the (C1–C8) alkyl esters of acrylic acid and the (C1–C8) alkyl esters of methacrylic acid, such as methyl methacrylate, methyl acrylate, ethyl acrylate, ethyl methacrylate, n-butyl methacrylate, n-butyl acrylate, 2-ethylhexyl acrylate, n-octyl acrylate, sec-butyl acrylate, isobutyl methacrylate, and cyclopropyl methacrylate.

Minor amounts of alpha, beta-ethylenically unsaturated monomers with appreciable water-solubility, such as acrylic acid, methacrylic acid, itaconic acid, citraconic acid, acrylamide and methacrylamide, may also be used in preparing the emulsion polymers used in the compositions of the present invention. As is well known in the art, the copolymerization of such water-soluble monomers with water-insoluble monomers often confers desirable properties upon the resulting copolymer, such as long-term latex stability, dispersability, increased adhesion to specific substrates, and the like.

Acidic monomers which may be used in preparing the emulsions employed in the instant invention are alpha, beta-monoethylenically unsaturated acids such as maleic, fumaric, aconitic, crotonic, citraconic, acryloxypropionic and higher oligomers of acrylic, acrylic, methacrylic, and itaconic acids. Further examples of acidic monoethylenically unsaturated monomers that may be copolymerized to form the water-insoluble addition polymers of the instant invention are partial esters of unsaturated aliphatic dicarboxylic acids and particularly, the alkyl half esters of such acids. Examples of such partial esters are alkyl half esters of itaconic acid, fumaric acid, and maleic acid wherein the alkyl group contains 1 to 6 carbon atoms. Representative numbers of this group of compounds include methyl acid itaconate, butyl acid itaconate, ethyl acid fumarate, butyl acid fumarate, and methyl acid maleate.

The emulsion polymers may contain alpha, beta-ethylenically unsaturated aromatic monomer, such as styrene, vinyl toluene, 2-bromo-styrene, o-bromo-styrene, p-chloro-styrene, o-methoxy-styrene, p-methoxy-styrene, allylphenyl ether, allyltolyl ether, and alphamethyl styrene.

The emulsion polymers of this invention may contain polar or polarizable nonionogenic hydrophilic monomer, such as acrylonitrile, methacrylonitrile, cis-and trans-crotonitrile, alpha-cyanostyrene, alpha-chloroacrylonitrile, ethyl vinyl ether, isopropyl vinyl ether, isobutyl vinyl ether, and butyl vinyl ether, diethylene glycol vinyl ether, decyl vinyl ether, vinyl acetate, hydroxyalkyl(meth)acrylates, such as 2-hydroxyethyl methacrylate, 2-hydroxyethylacrylate, 3-hydroxypropyl methacrylate, butanediol acrylate, 3-chloro-2-hydroxypropyl acrylate, 2-hydroxypropyl acrylate, 2-hydroxypropyl methacrylate, and vinyl thiols such as 2-mercaptopropyl methacrylate, 2-sulfoethyl methacrylate, methyl vinyl sulfide, and propyl vinyl sulfide.

The emulsion polymers of the instant invention may contain monomeric vinyl ester in which the acid moiety of the ester is selected from the aromatic and (C1-C18) aliphatic acids. Examples of such acids include formic, acetic, propionic, n-butyric, n-valeric, palmitic, stearic, phenyl acetic, benzoic, chloroacetic, dichloroacetic, gamma-chloro butyric, 4-chlorobenzoic, 2,5-dimethylbenzoic, o-toluic, 2,4,5-trimethoxy benzoic, cyclobutane carboxylic, cyclohexane carboxylic, 1-(p-methoxy phenyl)cyclohexane carboxylic, 1-(p-tolyl)-1-cyclopentane carboxylic, hexanoic, myristic, and p-toluic acids.

The monomer mix may also include multifunctional monomers such as allyl methacrylate, divinyl benzene, diethylene glycol dimethacrylate, ethylene glycoldimethacrylate, 1,6-hexanediol diacrylate, 1,3-butylene glycol dimethacrylate, trimethylol propane triacrylate, trimethylol propane trimethacrylate, and the like.

Conventional emulsion polymerization techniques may be used to prepare the polymers employed in the compositions of this invention. Thus, the monomers may be emulsified with an anionic or nonionic dispersing agent, about 0.5% to 10% thereof on the weight of total monomers can be used. Acidic monomers are water soluble and thus serve as dispersing agents which aid in emulsifying the other monomers used. A polymerization initiator of the free radical type, such as ammonium or potassium persulfate, may be used alone or in conjunction with an accelerator, such as potassium metabisulfite or sodium thiosulfate. The initiator and accelerator, commonly referred to as catalysts, may be used in proportions of 0.5% to 2% each based on the weight of monomers to be copolymerized. Thermal and redox processes may be used. The polymerization temperature may be from room temperature to 90° C., or more, as is conventional. Batch, gradual addition, continuous and multiple stage processes may be used.

Examples of emulsifiers which are suited to the polymerization process of emulsions used in the present invention include alkaline metal and ammonium salts of alkyl, aryl, alkaryl, and aralkyl sulfonates, sulfates, and polyether sulfates; the corresponding phosphates and phosphonates; and alkoxylated fatty acids, esters, alcohols, amines, amides; and alkylphenols.

Chain transfer agents, including mercaptans, polymercaptans, and polyhalogen compounds are often desirable in the polymerization mixture to control polymer molecular weight.

Suitable polymer latex binders are available commercially from a number of vendors. The relative amount of polymer latex used in the compositions of the present invention depends on the desired application. In general, the weight ratio of inorganic pigment to binder may be from 1/1 to about 5/1, preferably about 1/1 to 4/1. In the case of roof mastics, a pigment-to-binder ratio of from about 1/1 to 3/1 may be used with a ratio of about 2/1 preferred. It is desirable to maintain the pigment volume concentration below the critical pigment volume concentration, as is well known in the coatings art.

For aqueous latex based mastics, caulks, or sealants of the present invention, the total solids content may be from about 50% to about 90% by weight, preferably from about 60% to about 85%. Solids content is kept as high as possible while yet achieving a useful consistency.

Cationic Polymer

The preferred cationic polymer is polyamide-epichlorohydrin resin. The polyamide-epichlorohydrin resins are generally prepared by the reaction of a dicarboxylic acid with a polyalkylene polyamine to form a water-soluble, long-chain polyamide containing

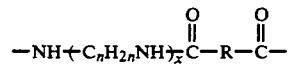

recurring units, where n and x are each 2 or more, preferably 2 to 4, and R is the divalent organic radical of the dicarboxylic acid. This long-chain polyamide is then reacted with epichlorohydrin to form a water-soluble cationic thermosetting resin. Polyamide-epichlorohydrin resin is available commercially as "Polycup" resin from Hercules, Inc. Solutions of different solids levels are sold under different product numbers, e.g., Polycup 172, Polycup 1884.

The ratio of flocculating agent to roof mastic formulation is important. The percentage of resin solids of flocculating agent based on total roof mastic formulation solids should be 0.3%-5%, preferably 0.5%-3% percent by weight. The ratio will depend upon the stability of the roof mastic formulation, with more polyamide-epichlorohydrin resin being required if the roof mastic is more stable to flocculation. When the coating is applied at higher spray rates, a higher ratio of flocculating agent is generally required to produce a quick set because the coating may not dry sufficiently between passes from the spray gun. Consequently, a stronger flocculating action is needed to prevent milky runoff when water impacts the coating. If too little flocculating agent is used, the roof mastic will not be flocculated to a sufficient degree. If too much flocculating spray is used, the liquid from the flocculant solution may reduce the overall solids of the mixture to such a degree that it causes a milky runoff from the coating. In other words, the diluting action of the water that solubilizes the polyamide-epichlorohydrin can overcome the flocculating action of the polyamide-epichlorohydrin resin. Therefore a high solids polyamide-epichlorohydrin solution is desirable to minimize dilution of the final coating, but the solids must not be so high that good atomization and mixing are not achieved.

In general, the solids level of the flocculating agent is lower than the solids level of the roof mastic formulation. Solids of the polyamide-epichlorohydrin resin solution may range from 10% to the solubility limit of the resin, preferably 15%-40%.

The polyamide-epichlorodhydrin resin is preferably an aqueous solution. Organic solvents, such as isopropanol, could be substituted for all or part of the water as long as solubility is maintained. Other quaternary cationic polymers can be used, but polyamide-epichlorohydrin is preferred.

METHOD OF APPLICATION

Preferably the flocculating agent and the roof mastic are simultaneously applied to the substrate. In one embodiment, the flocculating agent and the roof mastic are each sprayed as converging or overlapping streams and mix in the state of mist as they are applied to the substrate. The particular spraying machine used to apply the coating in this embodiment is not critical and includes any machine that can spray both the flocculating agent and the roof mastic formulation so that the spraying areas overlap. For example two spray guns can be used if they are regulated so that both spraying areas overlap, or a spray gun having two spray nozzles (e.g., Binks Model 69GW plural component spray gun, Binks Manufacturing Co., Franklin Park, Ill.). Alternatively, both the flocculating agent and the roof mastic formulation may be mixed internally and sprayed from one gun.

As an alternative to simultaneous cospraying, the polyamide-epichlorohydrin resin solution could be sprayed as a second coating on top of the first roof mastic coating.

It is believed that the cationic polyamide-epichlorohydrin resin flocculates the anionically dispersed emulsion polymer and pigments to form aggregates or agglomerates that are too large to be carried away by impinging rainwater or heavy dew. After removal of water, the polyamide-epichlorohydrin resin can slowly react with carboxyl groups in the emulsion polymer to improve water resistance:

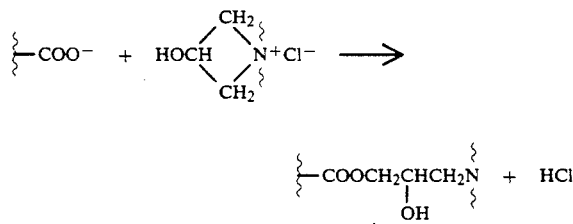

The polyamide-epichlorohydrin resin can also react with itself to eliminate ionic charge and reduce hydrophilicity:

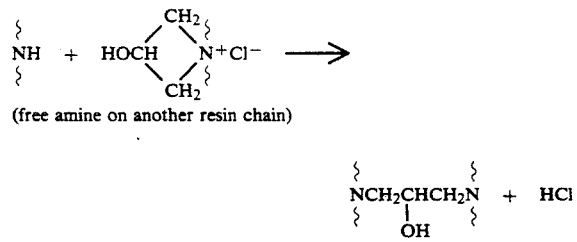

PIGMENTS AND ADDITIVES

As used in the instant specification and claims, the word "pigment" denotes inorganic materials which are used to impart aesthetic and functional qualities such as rutile and anatase titanium dioxide, synthetic pigment such as polymer particles and inorganic materials which are used to fill the compositions, such as calcium carbonate ("fillers").

The pigments are present in an amount of from 10 percent to 90 percent by weight of the total solids in the composition depending upon the consistency desired, the presence or absence of thickening agents, the amount and identity of solvent utilized, and so forth. Suitable pigments include rutile and anatase titanium dioxide, calcite, limestone, mica, talc, asbestos fiber or powder, diatomaceous earth, barytes, alumina, slate flour, calcium silicate, clay, colloidal silica, magnesium carbonate, magnesium silicate, zinc oxide and so on. The amounts of solvent, if any, pigment, and polymer solids are such as to give caulking compositions a dough-like consistency. Roof mastics have a somewhat thinner consistency with viscosity approximately 80–120 K.U.

The pigment used in the compositions of this invention can be dispersed using high speed dispersion equipment such as a Cowles disperser. Anionic polymer, such as polyacrylate or polyphosphate is used as a dispersing aid and in stabilizing the dispersion. Copolymers of acrylic acid and/or methacrylic acid with lower alkyl acrylates are preferred as dispersants. In another preferred embodiment, potassium tripolyphosphate is used to disperse the inorganic pigments. The amount of dispersant used depends on the surface area of the pigment employed per unit volume of the composition. The amount is easily determinable by those skilled in the coatings art by conventional techniques.

The anionic dispersants which may be used are anionically charged polymeric materials used to disperse the inorganic materials used to pigment or fill the coating, roof mastic, caulk or sealant compositions of the present invention. Sodium tripolyphosphate (CAS Reg. No. 7758-29-4) is a preferred anionic dispersant as is potassium tripolyphosphate. Polyacrylates are also preferred dispersants, and the combination of polyacrylates and polyphosphates are especially preferred. Other types of "condensed" phosphates, that is, dehydrated polymerized orthophosphate in which the $H_2O$ to $P_2O_5$ ratio is less than 3 to 1, may be used. Sulfonated polymers, including naphthalene-formaldehyde sulfonated polycondensates, polymaleates, natural product-derived dispersants, such as tannins, lignins, alginates, gluconates, glucosides, organic phosphonates including methylene phosphonates, may be used. The particular type and amount of dispersant employed may depend on the pigment types and grades selected, and particular grades of certain pigments, for example, titanium dioxide, are available commercially in predispersed form.

The compositions of the present invention may be thickened using conventional coatings thickeners as desired. For example, cellulosic thickeners such as methyl cellulose and hydroxyethyl cellulose may be used. Other types of thickeners and rheology modifiers, such as associative hydrophobic alkali soluble emulsions may also be used. The amount of thickener employed depends on the type of coatings product to be prepared, the pigment/binder ratio of the composition, the type and grade of thickener used, the application technique to used, etc.

The compositions of the present invention may also include conventional coatings ingredients such as can preservatives, antimicrobial agents, mildewicides, antifreeze agents, coalescents, defoaming agents, colorants, dyes, cosolvents, plasticizers and adhesion promoters.

The following Examples are provided to further illustrate the invention. These examples should not be read as limiting the scope of the invention which is described in the claims.

EXAMPLES

Preparation of the Latex Polymers

The latex polymers used, Rhoplex EC-1895 and Rhoplex EC-1791, were commercial acrylic roof mastics available from Rohm and Haas Company, Philadelphia, Pa. They were prepared by standard emulsion polymerization processes similar to the process described in U.S. Pat. No. 4,571,415.

Roof Mastic Preparation

Roof mastics were prepared using standard coatings techniques according to the formulations below.

| Roof Mastic Formulation ARM 95-3 Grind | | |
|---|---|---|
| Ingredient | Function | Weight (g) |
| Water | carrier | 140.0 |
| Hydroxyethylcellulose (Natrosol 250 MXR) | thickener | 3.5 |
| Ethylene glycol | coalescent | 25.6 |
| Foamaster VL | defoamer | 4.0 |
| KTPP | polyphosphate dispersant | 1.5 |
| Calcium Carbonate (Duramite) | filler pigment | 532.9 |
| Zinc Oxide (Kadox 515) | reactive pigment/stabilizer | 59.2 |
| Titanium Dioxide (Tipure R-960) | hiding/reflective | 88.8 |
| Rhoplex EC-1895 (62.5%) anionic emulsion polymer | binder | 116.4 |

Natrosol - Hercules, Inc., Wilmington, De. Foamaster VL - Process Chemical Div., Diamond Shamrock Chemicals Co., Morristown, N.J. Duramite - Thompson-Weinman & C., Cartersville, Ga. Kadox - New Jersey Zinc, Bethlehem, Pa. Tipure - E.I. duPont deNemours Co., Wilmington, De.; Rhoplex - Rohm & Haas Co., Philadelphia, Pa. KTPP - FMC Corp., Philadelphia, Pa.

The ingredients above were combined and ground for 15 minutes on a high speed disperser. The grind was let down at low speed while adding the following ingredients:

| Letdown Ingredient | Function | Weight (g) |
|---|---|---|
| Rhoplex EC-1895 | binder | 315.4 |
| Texanol | coalescent | 7.8 |
| Skane M-8 | mildewicide | 2.3 |
| Foamaster VL | defoamer | 6.0 |
| Water | carrier | 1.0 |
| Ammonium hydroxide (28%) | adjust pH | 7.1 |
| Properties | | |
| Pigment | | 2.58/1.0 |
| Pigment volume concentration | | 48.0 |
| Total solids, % | | 73.1 |

| Roof Mastic Formulation ARM 91-1 Grind | | |
|---|---|---|
| Ingredient | Function | Weight (g) |
| Water | carrier | 16.0 |
| Hydroxyethylcellulose (Natrosol 250 MXR) | thickener | 140.74 |
| Ethylene glycol | coalescent | 24.38 |
| Nopco NXZ | defoamer | 1.90 |
| KTPP | polyphosphate dispersant | 1.43 |
| Tamol 850 | dispersant | 4.76 |
| Calcium Carbonate (Duramite) | filler pigment | 422.72 |
| Zinc Oxide (Kadox 515) | reactive pigment/ stabilizer | 46.95 |
| Titanium Dioxide (Tipure R-960) | hiding/reflective | 70.37 |

Texanol - Eastman Kodak, Rochester, N.Y. Skane - Rohm & Haas, Philadelphia, Pa. Nopco NXZ - Process Chemical Division, Diamond Shamrock Chemicals Co., Morristown, N.J.

The ingredients above were combined and ground for 15 minutes on a high speed disperser. The grind was let down at low speed with the following ingredients:

| Letdown: Ingredient | Function | Weight (g) |
|---|---|---|
| Rhoplex EC-1791 (55.0%) | binder | 470.59 |
| Texanol | coalescent | 6.95 |
| Skane M-8 | mildewicide | 2.10 |
| Nopco NXZ | defoamer | 1.90 |
| Ammonium hydroxide (28%) | adjust pH | 0.95 |
| Grind for an additional 10 min. | | |
| Properties | | |
| Pigment to binder ratio | | 2.08/1.0 |
| Pigment volume concentration | | 43.0 |
| Total solids, % | | 66.9 |

DESCRIPTION OF PROCEDURES AND TEST METHODS

Spray Application

The sprayer employed was a Binks Model 69GW plural component spray gun with 68 fluid nozzle, orifice 0.110 inch; 68PB air nozzle; 568 fluid needle; providing 80 psi to atomizing nozzles; and generally 9–10 psi cup pressure. The cup pressure was varied depending on viscosity of the roof mastic formulation in order to achieve the desired flow rate. Flow rates were determined by spraying into a weighed wide-mouth polyethylene bottle for a measured time interval, reweighing the cup and calculating the flow rate in grams per minute. Coatings were prepared on steel panels, approximately 15 mils (0.38 mm) thick wet.

Washout Resistance

Coatings on steel panels were placed in a 32 ounce (0.95 liter) paper cup at an angle of about 60 degrees from the horizontal and supported at the top. The coating received two squirts from a plant sprayer (Freshness Plus Plant & Garden Spritzer, Environmental Control International, 409 Washington Ave., P.O. Box 10126, Baltimore, Md.) every 30 seconds over a period of 5 minutes. The distance from the nozzle to the coating was 8–10 inches (203–254 millimeters). The runoff was collected for observation and testing. Percentage transmittance of light through the runoff solution was measured at 349 nm versus a distilled water standard using a Perkin-Elmer Lambda 3B UV/VIS Spectrophotometer.

Water Absorption

Coatings were dried in the outside base of 4 ounce (118 milliliter) paper cup, 45 millimeter (mm) diameter, 4.8 mm thick for a week at 75% relative humidity and then oven dried at 70° C. for 3 hours. The dried coatings were immersed in deionized water, removed after the indicated time intervals, blotted with a paper towel, and weighed.

Water Ponding

This test measures the resistance to passage of water through a 20 mil (0.51 mm) thick film of roof mastic over 50 hours. Films of roof mastic were cast on STK-104-M1 (Arhco, 1450 N.W. Ave. W. Chicago, Ill.) release paper, a bonded white paper coated with polyethylene and silicone. The films were dried 7 days, removed from the release paper, turned over, and dried another 7 days. The bottom was removed from a ¼ pint (118 milliliter) paint can. A film of dried roof mastic film was glued to the can using a 90/10 blend (weight/weight) of Epon 828 (Shell Chemical Co.) epoxy resin and triethylenetetramine. After the epoxy glue hardened, the film was trimmed.

The can and film were placed on top of a weighed piece of 90 millimeter diameter Fisher P4 filter paper, and 35 milliliters of deionized water was added. After 50 hours, the filter paper was reweighed to determine how much water had passed through the roof mastic film.

If film thickness was not exactly 20 mils, the result was normalized to 20 mils by multiplying by actual film thickness in mils/20 mils.

EXAMPLE 1

This example demonstrates that cosprayed polyamide-epichlorohydrin resin can prevent milky runoff when a roof mastic is sprayed with water while Polycup 1884 (polyamide-epichlorohydrin a pale amber liquid having a specific gravity of 1.12, and a viscosity at 25° C. of 325 cps, Hercules, Inc.) was diluted to 18% solids with water and cosprayed at various proportions with ARM 95-3 roof mastic. After drying 5 minutes at room conditions, the coating was sprayed with deionized water to assess washout resistance. Results are listed in Table I in decreasing order of Polycup proportion. The "effective solids" listed is the amount of water in the overall coating, i.e., the calculated solids based on mixing Polycup and ARM 95-3.

When effective solids was below about 69%, runoff was milky. This was because the Polycup solution added too much water to the coating and prevented setting (flocculation and coalescence).

There was an optimum range of Polycup proportions that produced clear runoff, 0.3-1.9% based on ARM 95-3 nonaqueous. The higher Polycup proportions diluted the coating excessively with water (lower "effective solids").

TABLE I

| Roof Mastic ARM-95-3 Cosprayed with Polycup 1884 (18% Solids) | | | | | |
|---|---|---|---|---|---|
| Solution Flow Rate (grams/minute) | | % Polycup Solids on ARM 95-3 Nonaqueous | Effective Solids (%) | Appearance of Runoff | Dry time before spraying |
| ARM 95-3 | Polycup | | | | |
| 47.5 | 13.1 | 6.8 | 61.1 | near opaque | 10 |
| 47.5 | 6.8 | 3.5 | 66.1 | very cloudy | 10 |
| 47.5 | 4.5 | 2.4 | 68.1 | very cloudy | 10 |
| 27.8 | 2.1 | 1.9 | 69.1 | clear | 5 |
| 18.4 | 1.2 | 1.7 | 69.5 | clear | 5 |
| 20.1 | 1.2 | 1.5 | 69.8 | clear | 10 |
| 47.5 | 2.6 | 1.3 | 70.2 | opaque | 10 |
| 36.8 | 1.8 | 1.2 | 70.5 | clear | 5 |
| 27.8 | 1.3 | 1.1 | 70.6 | clear | 10 |
| 47.5 | 1.4 | 0.7 | 71.4 | clear | 10 |
| 32.5 | 0.8 | 0.6 | 71.7 | clear | 10 |
| 36.8 | 0.7 | 0.5 | 72.0 | clear | 10 |
| 27.8 | 0.4 | 0.3 | 72.3 | clear | 5 |

TABLE I-continued

| Roof Mastic ARM-95-3 Cosprayed with Polycup 1884 (18% Solids) | | | | | |
|---|---|---|---|---|---|
| Solution Flow Rate (grams/minute) | | % Polycup Solids on ARM 95-3 Nonaqueous | Effective Solids (%) | Appearance of Runoff | Dry time before spraying |
| ARM 95-3 | Polycup | | | | |
| 27.8 | 0.2 | 0.1 | 72.7 | clear | 10 |

EXAMPLE 2

This example demonstrates that a 36% solids Polycup solution also prevented milky runoff.

Example 1 was repeated except that Polycup concentration was increased from 18% to 36%. Essentially clear runoff solutions were obtained at 0.4-2.5% Polycup solids on ARM 95-3 nonaqueous (Table II).

TABLE II

| Roof Mastic ARM 95-3 Cosprayed with Polycup 1884 (36% Solids) | | | | | |
|---|---|---|---|---|---|
| Solution Flow Rate (grams/minute) | | % Polycup Solids on ARM 95-3 Nonaqueous | Effective Solids (%) | Appearance of Runoff | Dry time before spraying |
| ARM 95-3 | Polycup | | | | |
| 23.4 | 2.4 | 5.0 | 69.6 | opaque | 5 |
| 23.4 | 1.4 | 3.0 | 70.9 | opaque | 5 |
| 23.4 | 1.2 | 2.5 | 71.2 | v. sl. cloudy* | 10 |
| 23.4 | 0.2 | 0.4 | 72.7 | v. sl. cloudy | 5 |
| 23.4 | 0.07 | 0.2 | 72.9 | opaque | 5 |

*v. sl. cloudy = very slightly cloudy

EXAMPLE 3

This example demonstrates that addition of polyamide-epichlorohydrin resin decreased the amount of water transmission through roof mastic films.

Polycup 172 (polyamide-epichlorohydrin a pale amber liquid having a specific gravity of 1.03, and a viscosity at 25° C. of 50 cps, Hercules) was stirred into ARM 95-3 roof mastic at 0.10% and 0.23% solids on nonaqueous. Dried films were subjected to the water ponding test. Results in Table III show that Polycup reduced water transmission.

TABLE III

| Water Ponding Performance of Roof Mastic | |
|---|---|
| Roof Mastic Used | Water Ponding (milligrams/20 mils/50 hours) |
| ARM 95-3 | 95 +/− 32 |
| ARM 95-3 + 0.1% Polycup 172 | 80 +/− 27 |
| ARM 95-3 + 0.23% Polycup 172 | 40 +/− 6 |

EXAMPLE 4

This example demonstrates that films of ARM 95-3 roof mastic containing 0.23% Polycup 172 polyamide-epichlorohydrin resin (solids on ARM 95-3 nonaqueous) absorb less water than films without the polyamide-epichlorohydrin. Water absorption of films were tested according to the procedure described above. The data in Table IV shows that a film of roof mastic that contains polyamide-epichlorohydrin (Example 4) absorbs less water than one without, the Control.

TABLE IV

Water Absorption of ARM 95-3 Roof Mastic Cosprayed with Polycup

| Time (hours) | Water Absorption (%) | |
|---|---|---|
| | Control (0% Flocculant) | Example 4 (0.23%) |
| 1 | 8.67 | 8.21 |
| 2 | 11.98 | 8.19 |
| 3 | 13.69 | 7.20 |
| 10 | 14.13 | 6.10 |
| 21 | 12.40 | 5.61 |
| 28 | 11.43 | 5.28 |

EXAMPLE 5

This example demonstrates the use of Merquat 100 (dimethyldiallyl-ammonium chloride) as the cationic quaternary polymer in preventing milky runoff. Example 1 was repeated except that Merquat 100 was substituted on an equal weight basis for Polycup. Samples were dried either 10 minutes or 5 minutes before spray testing. The longer the dry time, the less severe the test; when dry time is longer, more water can evaporate, thereby bringing polymer and pigment particles together faster to irreversibly "set" the coating against runoff. Washout resistance results appear in Table V which indicate that a narrow "window" of percent Merquat solids on ARM 95-3 nonaqueous produced clear runoff.

TABLE V

Cosprayed of Roof Mastic 95-3 with Merquat Solution

| Solution Flow Rate (grams/minute) | | % Merquat Solids on ARM 95-3 Nonaqueous | Effective Solids (%) | Appearance of Runoff | Dry time before spraying |
|---|---|---|---|---|---|
| ARM 95-3 | Merquat | | | | |
| 36.6 | 2.25 | 1.52 | 69.8 | opaque | 10 |
| 36.6 | 2.25 | 1.52 | 69.8 | opaque | 5 |
| 36.6 | 1.52 | 1.02 | 70.8 | opaque | 10 |
| 37.8 | 0.89 | 0.58 | 71.7 | sl. cloudy | 10 |
| 37.8 | 0.89 | 0.58 | 71.7 | mod. cloudy | 5 |
| 37.8 | 0.33 | 0.22 | 72.5 | clear | 10 |
| 37.8 | 0.33 | 0.22 | 72.5 | mod. cloudy | 5 |
| 37.8 | 0.14 | 0.09 | 72.8 | clear | 10 |
| 37.8 | 0.14 | 0.09 | 72.8 | opaque | 5 |

Water absorption of films was tested according to the procedure described above. The results are shown in Table VI.

TABLE VI

Water Absorption of ARM 95-3 Roof Mastics

| Time (hours) | Control 0% | Merquat 100 0.17% | Polycup 1884 0.23% | 2.86% |
|---|---|---|---|---|
| 1 | 8.67 | 3.86 | 3.71 | 7.34 |
| 2 | 11.98 | — | — | — |
| 3 | 13.69 | — | — | — |
| 4 | — | 9.33 | 8.10 | 10.32 |
| 7 | — | 11.56 | 10.50 | 10.89 |
| 10 | 14.13 | — | — | — |
| 15 | — | 15.82 | 15.19 | 11.05 |
| 21 | 12.40 | — | — | — |
| 27 | — | 19.00 | 19.41 | 11.25 |
| 28 | 11.43 | — | — | — |
| 36 | — | 20.47 | 21.44 | — |
| 39 | — | — | — | 10.93 |
| 50 | — | 21.87 | 23.75 | — |
| 53 | — | — | — | 10.60 |
| 71 | — | — | — | 10.24 |
| 96 | — | 24.52 | 27.15 | — |
| 155 | — | 25.54 | 28.00 | — |

EXAMPLE 6

This example demonstrates the effectiveness of cosprayed polyamide-epichlorohydrin resin with another roof mastic formulation, ARM 91-1. The procedure of Example 1 was repeated except that the roof mastic formulation was ARM 91-1 instead of ARM 95-3. Coatings were air dried for 5 minutes before spraying with water.

As can be seen in Table VII, clear runoff solutions were obtained in tests that used from 0.8–1.8% Polycup 1884 on ARM 91-1 nonaqueous. This data indicates that a higher minimum concentration of flocculant was required for ARM 91-1 which has a lower solids and pigment volume concentration and is higher in dispersant concentration than the ARM 95-3 formulation (See Example 1).

TABLE VII

Cospray of ARM 91-1 Roof Mastic with Polycup

| Solution Flow Rate (g/min.) | | % Polycup Solids on ARM 91-1 Nonaqueous | Effective Solids (%) | Appearance of Runoff |
|---|---|---|---|---|
| ARM 91-1 | Polycup | | | |
| 25.2 | 0.0 | 0.0 | 66.9 | milky opaque |
| 25.2 | 0.2 | 0.3 | 66.5 | milky opaque |
| 25.2 | 0.8 | 0.8 | 65.5 | clear |
| 25.2 | 1.2 | 1.2 | 64.8 | clear |
| 25.2 | 1.7 | 1.8 | 63.9 | clear |
| 25.2 | 5.2 | 5.6 | 58.5 | milky opaque |

EXAMPLE 7

This example demonstrates that polyamide-epichlorohydrin resin decreases water transmission through ARM 91-1 roof mastic films. The procedure of Example 3 was repeated except that ARM 91-1 was the roof mastic instead of ARM 95-3. Results in Table VIII show that Polycup reduced water transmission.

TABLE VIII

Water ponding Performance of Roof Mastic

| Roof Mastic Used | Water Ponding (mg/20 mil/50 hrs) |
|---|---|
| ARM 91-1 | 263 +/− 7 |
| ARM 91-1 + 0.46% Polycup 172 | 69 +/− 8 |

I claim:

1. A two-part washout resistant roof mastic for application to a surface comprising:
   a) in one pack, an aqueous emulsion of aqueous-insoluble anionic polymer having a solids contents of from about 50% to about 90%, and b) in a second pack, an organic quaternary amine solution having greater than about 10% organic quaternary amine solids, the percentage of resin solids of organic quaternary amine being from about 0.3% to about 5% based on the total roof mastic solids, in an amount effective to flocculate the anionic polymer emulsion when the contents of the two packs are mixed.

2. A two-part roof mastic as in claim 1 wherein the organic quaternary amine is polyamide-epichlorohydrin resin.

3. A two-part roof mastic as in claim 2 wherein the amount of part b) is 0.5%-3% by weight of part a) on a solids basis.

4. A process for applying a washout resistant coating to a surface comprising contacting the surface with a first liquid from a first container and a second liquid from a second container such that the two liquids mix to form a coating that sets quickly wherein the first liquid is an anionic polymer emulsion and the second liquid contains an organic quaternary amine.

5. A process according to claim 4 wherein the organic quaternary amine is polyamide-epichlorohydrin resin.

6. A process according to claim 4 wherein the first liquid and second liquid are mixed in proportions that yield a coating in which the amount of organic quaternary amine is 0.3%-5% by weight of the anionic polymer emulsion on a solids basis.

7. A process according to claim 4 wherein the first liquid and second liquid are mixed in proportions that yield a coating in which the amount of organic quaternary amine is 0.5%-3% by weight of the anionic polymer emulsion on a solids basis.

8. A process according to claim 4 wherein the solids content of the coating is greater than about 69 percent.

* * * * *